(12) United States Patent
Walker et al.

(10) Patent No.: US 9,717,114 B1
(45) Date of Patent: *Jul. 25, 2017

(54) THERMOS WITH PELTIER

(71) Applicants: Dakota James Walker, Milton, FL (US); Charles Welch, Mobile, AL (US)

(72) Inventors: Dakota James Walker, Milton, FL (US); Charles Welch, Mobile, AL (US)

(73) Assignee: George L Williamson, Fairhope, AL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/152,176

(22) Filed: May 11, 2016

Related U.S. Application Data

(63) Continuation-in-part of application No. 14/077,273, filed on Nov. 12, 2013, now Pat. No. 9,377,223.

(51) Int. Cl.
  *H05B 1/02* (2006.01)
  *B65D 23/10* (2006.01)
  *B65D 81/18* (2006.01)

(52) U.S. Cl.
  CPC ........... *H05B 1/0297* (2013.01); *B65D 23/10* (2013.01); *B65D 81/18* (2013.01)

(58) Field of Classification Search
  CPC ....... H05B 1/0297; B65D 81/18; B65D 23/10
  See application file for complete search history.

(56) References Cited

U.S. PATENT DOCUMENTS

| | | | |
|---|---|---|---|
| 5,042,258 A * | 8/1991 | Sundhar | A47G 19/2288 62/3.2 |
| 5,421,159 A | 6/1995 | Stokes | |
| 5,572,872 A * | 11/1996 | Hlavacek | A47G 23/04 62/3.3 |
| 5,842,353 A * | 12/1998 | Kuo-Liang | A47G 19/2288 219/419 |
| 6,032,481 A * | 3/2000 | Mosby | A47J 36/30 165/74 |
| 6,134,894 A | 10/2000 | Searle | |
| 6,422,024 B1 * | 7/2002 | Foye | A47G 19/2288 62/3.2 |
| 6,591,615 B1 * | 7/2003 | Luo | F25B 21/04 62/3.3 |
| 6,852,954 B1 | 2/2005 | Liu | |
| 7,182,222 B2 | 2/2007 | Prabucki | |
| 2003/0005626 A1 | 1/2003 | Yoneda et al. | |
| 2004/0130156 A1 | 7/2004 | Hartman et al. | |

* cited by examiner

*Primary Examiner* — Emmanuel Duke
(74) *Attorney, Agent, or Firm* — George L Williamson

(57) ABSTRACT

Method and apparatus for a thermos having a peltier or similar thermoelectric device mounted thereon wherein the peltier is operated by turning a generator assembly so that the peltier is actuated. The apparatus is designed for use in emergency or survival situations where there is no electricity available. The wall of the container is adapted to receive a peltier therein. The peltier comprises an aluminum block having fins thereon that forms a cooling or heating module to heat or cool liquid contained inside the container. The peltier may be attached to the container or operated at a distance therefrom. A battery may also boost the energy from the generator assembly.

20 Claims, 2 Drawing Sheets

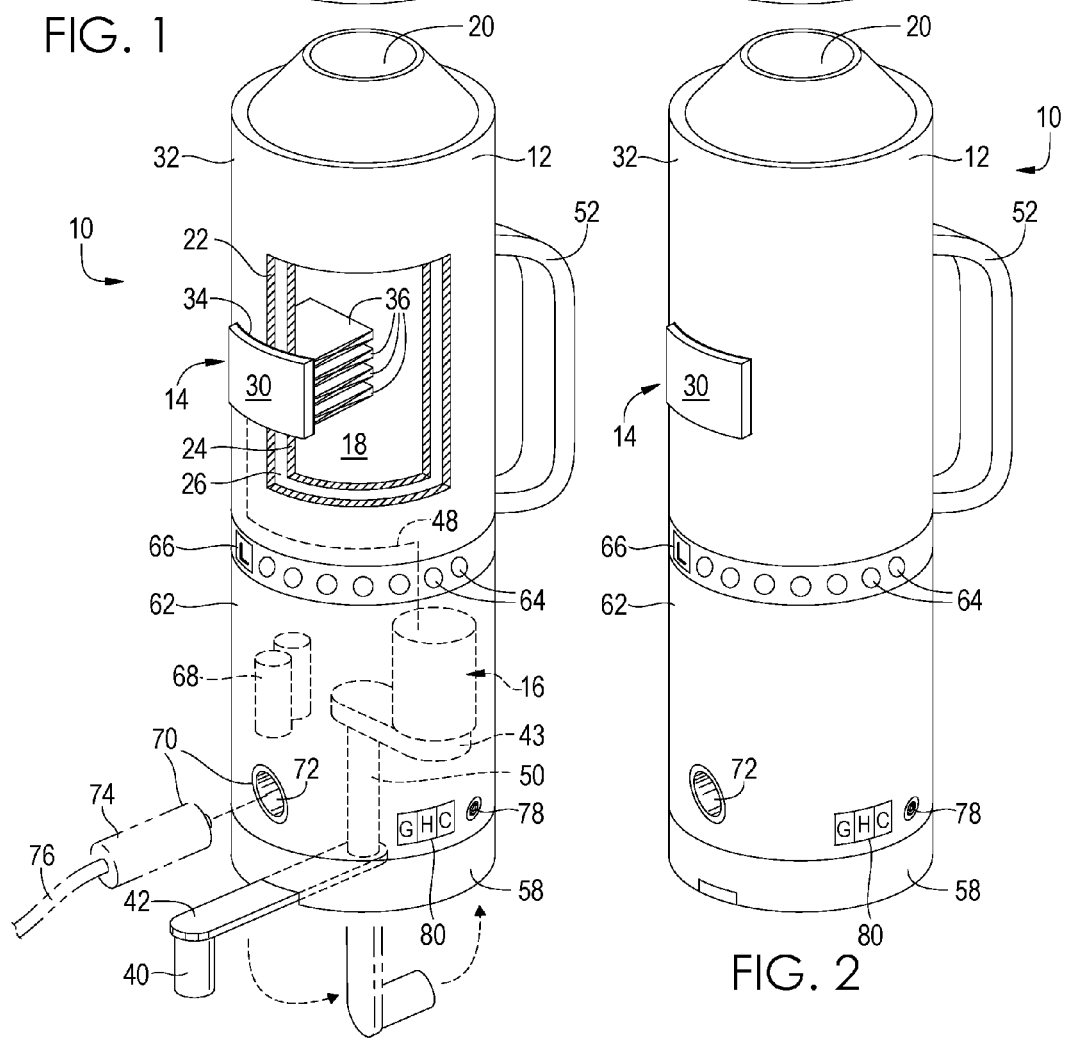

THERMOS WITH PELTIER

RELATED APPLICATIONS

This application is a continuation-in-part of U.S. patent application Ser. No. 14/077,273 filed on Nov. 12, 2013.

BACKGROUND OF THE INVENTION

Field of the Invention

The present invention relates generally to thermoses and, more particularly, is concerned with a thermos having a peltier mounted thereon.

Description of the Related Art

Devices relevant to the present invention have been described in the related an, however, none of the related art disclose the unique features of the present invention.

In U.S. Pat. No. 7,182,222 dated Feb. 27, 2007, Prabucki disclosed a solar panel and water dispenser for holding a liquid beverage. In U.S. Pat. No. 5,421,159 dated Jun. 6, 1995, Stokes disclosed a beverage cooler and dispenser. In U.S. Pat. No. 6,032,481 dated Mar. 7, 2000, Mosby disclosed a thermal regulating container. In U.S. Pat. No. 6,134,894 dated Oct. 24, 2000, Searle, et al., disclosed a method of making a beverage container with heating or cooling insert. In U.S. Pat. No. 6,422,024 dated Jun. 23, 2002, Foye disclosed an insulated beverage cooling container. In U.S. Pat. No. 6,852,954 dated Feb. 8, 2005, Liu, et al., disclosed a built-in electric heating structure for a travel mug or thermos bottle. In U.S. Pat. No. 5,042,258 dated Aug. 27, 1991, Sundhar disclosed a drinking container. In U.S. Patent Application Publication No. 2003/0005626 dated Jan. 9, 2003, Yoneda, et al. disclosed a plant cultivator and control system therefor. In U.S. Patent Application Publication No. 2004/0130156 dated Jul. 8, 2004, Hartman, et al. disclosed a mobile electrical power source.

While these devices may be suitable for the purposes for which they were designed, they would not be as suitable for the purposes of the present invention as hereinafter described. As will be shown by way of explanation and drawings, the present invention works in a novel manner and differently from the related art.

SUMMARY OF THE PRESENT INVENTION

The present invention discloses a conventional thermos/container bottle having a peltier or similar thermoelectric device mounted thereon wherein the peltier is operated by turning a crank handle so that the peltier is actuated. The present invention is designed for use in emergency or survival situations where there is no electricity available. The present invention comprises a conventional thermos bottle having a wall thereof adapted to receive a peltier therein. The peltier comprises an aluminum block having fins thereon that forms a cooling or heating module to heat or cool liquid contained inside the thermos. The peltier of the present invention is attached to the thermos so as to firmly attach the peltier to the wall of the thermos. A battery is also provided and may be used to boost the energy level available from the generator assembly to the peltier.

An object of the present invention is to provide a peltier onto a conventional thermos for use in emergency and/or survival situations. A further object of the present invention is to provide a peltier which can be manually operated for use in an emergency situation. A further object of the present invention is to mount the peltier having a portion extended into the liquid container area of the thermos so that the liquid contained within the thermos can be either heated or cooled. A further object of the present invention is to provide a heated or cooled thermos which can be easily operated by a user. A further object of the present invention is to provide a thermos having a peltier thereon which can be relatively inexpensively and easily manufactured.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which:

FIG. 1 is a perspective cutaway view of the present invention.

FIG. 2 is an exterior perspective view of the present invention.

LIST OF REFERENCE NUMERALS

Figure 4:
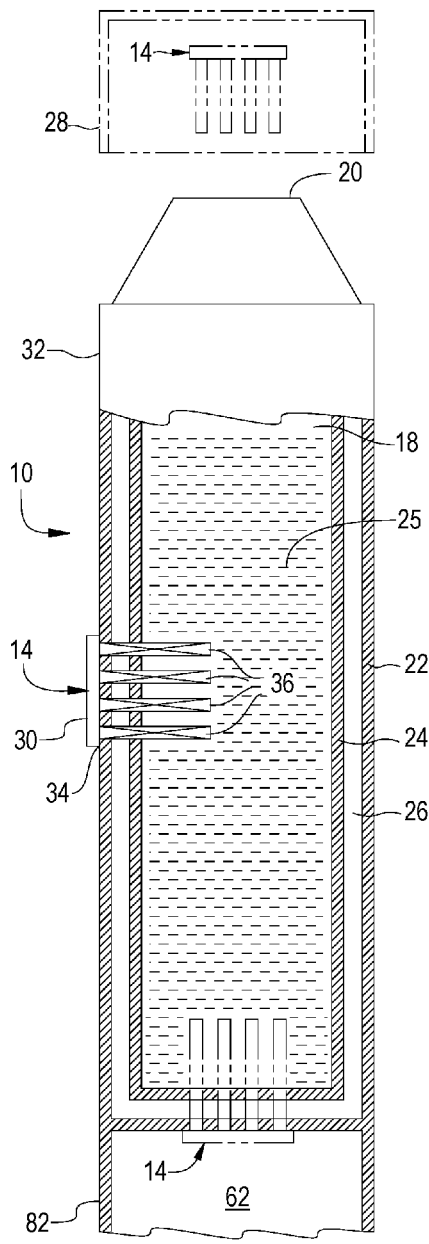
FIG. 4 is a cross sectional view of portions of the present invention.

With regard to reference numerals used, the following numbering is used throughout the drawings.

10 present invention
12 thermos/container
14 peltier assembly
16 generator assembly
18 interior space/area
20 inlet/outlet
22 outer wall
24 inner wall
25 liquid beverage/material
26 space
28 top
30 base
32 outer wall surface
34 adhesive
36 conduction fins
38 generator
40 hand grip
42 crank arm/handle
43 enclosure for gear assembly
44 gear assembly
46 central axis/axle
48 electrical connections
50 shaft
52 carrying handle 54 hinge
56 recess
58 bottom end portion
60 axle
62 compartment
64 light
66 switch
68 battery
70 cigarette lighter assembly
72 receptacle
74 plug
76 cord
78 input plug
80 control panel of switches
82 wall of compartment
84 male/female electrical jack.

DETAILED DESCRIPTION OF THE
PREFERRED EMBODIMENT

The following discussion describes in detail at least one embodiment of the present invention. This discussion should not be construed, however, as limiting the present invention to the particular embodiments described herein since practitioners skilled in the art will recognize numerous other embodiments as well. For a definition of the complete scope of the invention the reader is directed to the appended claims. FIGS. 1 through 5 illustrate the present invention wherein a thermos having a peltier mounted thereon is disclosed and which is generally indicated by reference number 10.

Figure 3:
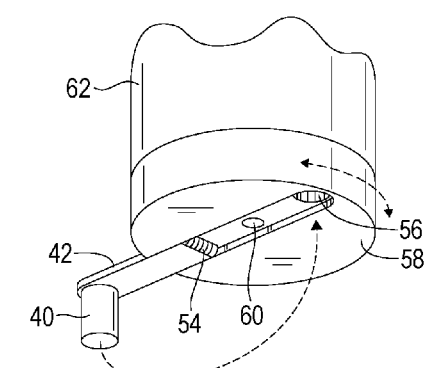
FIG. 3 is a perspective view of the lower portion of the present invention.

Turning to FIG. 1-3, therein is shown the present invention 10 including a thermos/container bottle 12 portion having a peltier assembly 14 or the like mounted thereon along with a generator assembly 16 and having a carrying handle 52 disposed thereon. The thermos bottle 12 has an internal area 18 having an inlet/outlet opening 20 on its upper end for putting materials into and removing them therefrom along with an outer wall 22 and an inner wall 24 for containing food items or liquid materials (not shown, see item 25 in FIG. 4) therein along with a space 26 between the outer and inner wall which may be an air space or may comprise additional insulating materials, or, under certain circumstances, the inner and outer walls may be a single unitary wall so that no space is provided thereinbetween similar to inner wall 24. Also shown is a cap or top 28 for sealing closed the inlet/outlet 20 provided on the upper end of the thermos. The peltier assembly 14 includes a base 30 which may be attached to the outer surface 32 of the outer wall 22 using many different methods, e.g., some sort of adhesive material or bolts, screws or the like for attaching the base to the outer wall 22 of thermos 12. Also shown are the conduction fins 36 disposed internal the thermos 12 in interior space 18 so that the fins can heat or cool materials or food stuffs such as beverage inside the thermos.

Also shown in FIG. 1 is a generator assembly 16 having a generator portion having a hand grip 40 for being gripped by the hand of a user mounted onto a crank arm or handle 42 connected to an assembly of gears 44 contained in enclosure 43 which handle and gears turn the central axle 46 of the generator on its central axis so as to provide energy to the peltier assembly 14. Handle 42 is shown being movable between a first unfolded extended position suitable for cranking and a second folded position wherein the handle is stored out of the way wherein the movement between the first and second positions is indicated by direction arrows.

As best seen in FIG. 3, crank arm 42, or the hand crank, includes a hinge 54 allowing the arm to be moved between the first and second positions so that the hand grip 40 can be stored away in recess 56 allowing the handle to be flush with the rotatable bottom end portion 58 of the thermos/container 12. Central pivot/axle 60 of arm/handle 42 is also shown. The movement between the first extended position and second retracted position is indicated by direction arrows.

A compartment portion 62 is also shown being separated on the lower portion of the thermos 12 wherein some or all of the components of the present invention 10 are contained and mounted including the generator assembly 16. Also shown inside the compartment 62 are other components including the battery 68. Also shown are the electrical connecting wires 48 using single wire convention for electrically connecting the generator assembly 16 to the peltier assembly 14. Shaft 50 is shown connecting an end of handle 42 to the gear assembly 44.

Also shown are a plurality of lights 64, e.g., such as a light emitting diode (LED), disposed on or about the container 12 for illuminating and facilitating use of the present invention 10 in poor light conditions; light switch 66 is also shown for controlling the light(s) 64. Also shown are batteries 68, which may be rechargeable batteries, which serve as an auxiliary power supply which can be used to boost the energy level delivered to the peltier assembly 14 by the generator assembly 16 and/or to supply power to a cigarette lighter assembly 70 which includes a receptacle 72 and a plug 74 attached on the end of a cord 76. Energy from the battery 68 may increase the energy level from the generator assembly 16 so that together they can heat the contents of the thermos 12 faster than if only the generator assembly 16 alone is used. The cigarette lighter assembly 70 may be used to light cigarettes or to assist in starting a fire or for providing heat for other purposes related to a survival related situation or for primitive camping or the like. Batteries 68 may also be recharged by using the generator assembly 16.

Also provided is an input plug or plug-in 78, such as a pin-plug, for receiving direct current (DC) from an AC/DC adapter to be used for three things as follows: a) recharging the battery 68 directly from an alternating current (AC) supply such as a conventional 110 volt wall outlet; b) charging an external small electrical device, e.g., cell phones or the like, by using the cigarette socket output 72 as a source of direct current (DC) and using a conventional commercially available adapter plug having a USB output plug thereon; and, c) operating the LED lights 64 to use as, e.g., a night light for lighting a tent or the like. A panel of control switches are provided at 80 for controlling various functions of the present invention 10, wherein "H" represents "heat," and "C" represents "cold" which switches may be used to switch the generator assembly and control the peltier assembly 14 to either continually heat or cool thereby allowing the handle 42 to be turned in only one direction so that the operator does not have to reverse the turning direction from, e.g., clockwise to counterclockwise, in order to change the heating/cooling function of the peltier. This allows the operator to turn the generator handle 42 in only one user-selected direction while enabling the peltier to either heat or cool which is expected to make it physically easier for an operator to use the generator assembly 16 because, e.g., a right-handed operator may prefer a turning direction different from a left-handed operator. The control switch 80 labeled "G" represents "generator" which sets the generator assembly 16 to function for its basic purpose, i.e., a generator, so that the battery 68 can be recharged by operating the generator assembly 16 but without routing voltage to the peltier assembly 14.

Turning to FIG. 4, therein is shown the present invention 10 being a thermos bottle 12 having a conventional peltier assembly 14 mounted thereon. The thermos bottle 12 has an internal area 18 having an inlet/outlet opening 20 at its upper end for allowing materials 25 to be placed into and removed from the thermos bottle along with an outer wall 22, an inner wall 24 for containing the liquid materials 25 therein along with a space 26 between the outer and inner wall. The peltier assembly 14 having a base 30 capable of being attached to the outer surface 32 of the wall 22 as previously described, the lower end portion of the thermos/container portion having the interior space 18 therein, and in the top 28 which would be wired to the energy source in the standard manner as would be done by one skilled in the art. Also shown are the conduction fins 36 disposed internal the thermos 12 so that they can heat or cool beverage material 25 inside the thermos. Wall 82 of the lower compartment 62 is also shown.

Figure 5:
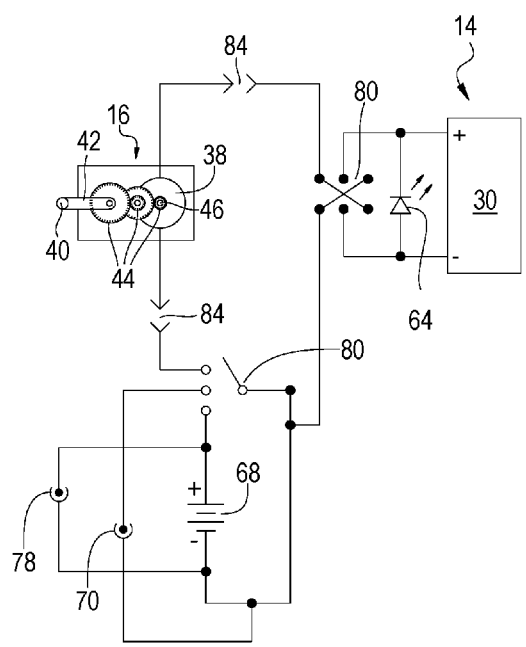
FIG. 5 is an illustration of an exemplary electrical circuit and components for the present invention.

Turning to FIG. 5, therein is shown an illustration of an exemplary circuit diagram or schematic for the present invention 10, however, it is not represented that FIG. 5 discloses a circuit providing therein all of the possible functions disclosed in this application for the present invention 10. One skilled in the art would realize that numerous circuit diagrams different from FIG. 5 could also be used with the present invention 10. It is also possible to provide an embodiment for the present invention 10 wherein the generator assembly 16 is located remote from the thermos 12 wherein the generator assembly and the thermos are separated from each other as indicated by a pair of male/female electrical jacks 84 wherein the generator assembly is a stand-alone piece of equipment unlike the embodiment shown in FIG. 1. Generator assembly 16 and gear assembly 44 are also shown in FIG. 5. Previously disclosed elements are also shown including the control panel of switches 80 which is expected to contain many if not all of the switches necessary for proper functioning of the electrical components of the present invention as previously disclosed including the peltier assembly 14, light 64, battery 68, cigarette lighter assembly 70, and input plug 78. Also shown are generator 38 with central axis/axle 46, hand grip 40, crank arm/handle 42, and gear assembly 44. The control panel 80 includes a double pole double throw switch expected to be used for reversing current for providing the hot or cold feature and a multi-position selector switch for allowing the user to choose the electrical input for providing other electrical functions as previously disclosed. Input plug 78 is expected to be used for receiving the input jack from a AC/DC adapter that supplies energy/voltage, e.g., 9 volts, to charge the battery 68 using conventional alternating current with care being taken to assure that any power source used will not supply enough instantaneous amperage to overpower the peltier module 14.

The peltier effect of the present invention 10 occurs whenever electrical current flows through two dissimilar conductors. Depending on the direction of current flow, the junction of the two conductors will either absorb or release heat. Regarding the present invention 10, when handle 42 is turned, e.g., clockwise, the generator assembly 16 would cause the peltier assembly 14 to, e.g., absorb heat, thereby cooling the liquid material 25 contained in the thermos 12. Likewise, when handle 42 is turned in the opposite direction, i.e., counterclockwise, the liquid 25 would be heated in the thermos 12. Also, battery 68 can be used to assist in boosting the energy level provided to the peltier assembly 14 to a level greater than the energy level from the generator assembly 16 alone as previously disclosed.

By way of additional information, the present invention 10, provides a thermos 12 for which the contents 25 are either heated or cooled with a peltier assembly (heat pump) or module 14. Using a conventional thermos 12, a hole is cut or otherwise provided through the side to accommodate an aluminum block that has its fins 36 milled out to in essence form a cooling/heating dissipation conducting module. On this would be attached a peltier (heat pump) module 14 via screws or the like to firmly attach it to the aluminum block with no less than three foot pounds of force and no more than five foot pounds of force, with thermal paste to assure adequate thermal bonding. The peltier (heat pump) 14 is expected to be powered by a 23 turn electric motor/generator 38 that will be hand cranked by gearing 44 to achieve roughly 13 volts. It is expected that the operator will have to achieve at least 100 revolutions per minute which will spin the electric motor 38 at least 2100 revolutions per minute, which will give 13 volts and 3 amps worth of power for 39 watts of energy. The higher the revolutions per minute of the electric motor/generator 38 the higher the energy output and the higher the temperature from the peltier (heat pump) assembly 14. Of course, the booster battery 68 would increase the voltages/energy referenced herein. All of the above numerical values are approximate.

By way of general explanation, a peltier or thermoelectric device or module is in essence a heat pump, meaning that it will take heat from one side and transfer it to the other side. The thermoelectric effect (or peltier effect) is the direct conversion of temperature differences to electric voltage and vice versa. A thermoelectric device creates voltage when there is a different temperature on each side. Conversely, when a voltage is applied to it, it creates a temperature difference, the presence of heating or cooling at an electrified junction of two different conductors. Also, because of the low efficiency it heats more and better than it cools.

We claim:

1. An apparatus for heating or cooling contents of a thermos bottle, comprising: a) a thermos bottle, said thermos bottle having at least one wall enclosing an interior space, said wall having an exterior surface, a compartment portion disposed on said thermos bottle; b) a Peltier having a base portion and a conduction fin portion, wherein said base portion is disposed on said exterior surface and said conduction fin portion extends through said wall into said interior space; c) a generator assembly for providing electrical energy to said Peltier, wherein said generator assembly is electrically connected to said Peltier for providing electrical energy thereto, wherein said generator assembly is disposed on an inside of said compartment portion; d) wherein said generator assembly is configured to be operated manually using a hand crank for providing electrical energy to said pettier; and, e) said generator assembly is configured so that when said hand crank is turned in one direction the contents of said thermos bottle is heated, and when said hand crank is turned in an opposite direction the contents of said thermos bottle is cooled.

2. The apparatus of claim 1, further comprising a battery adapted to increase the electrical energy provided by said generator assembly to said Peltier.

3. The apparatus of claim 2, wherein said battery is adapted to be charged by said generator assembly.

4. The apparatus of claim 3, wherein said generator assembly is adapted to charge an external electrical device.

5. The apparatus of claim 4, wherein said generator assembly is configured so that the contents of said thermos bottle is heated when said hand crank is turned in one direction or in an opposite direction.

6. The apparatus of claim 5, wherein said generator assembly is configured so that the contents of said thermos bottle is cooled when said hand crank is turned in one direction or in an opposite direction.

7. The apparatus of claim 6, further comprising a light disposed on said thermos bottle.

8. The apparatus of claim 7, further comprising a carrying handle is disposed on said thermos bottle.

9. The apparatus of claim 8, wherein said generator assembly is configured to be spaced apart from said thermos bottle.

10. A method for heating or cooling contents of a thermos bottle comprising the steps of: a) providing a thermos bottle having at least one wall enclosing an interior space, the wall having an exterior surface, providing a compartment portion on the thermos bottle; b) providing a Peltier having a base portion and a conduction tin portion, wherein the base portion is disposed on the exterior surface and the conduction fin portion extends through the wall into the interior space; c) providing a generator assembly for providing electrical 16 energy to the Peltier, electrically connecting the generator assembly to the Peltier so that electrical energy is provided thereto, disposing the generator assembly on an inside of the compartment portion; d) configuring the generator assembly to be operated manually using a hand crank; and, e) tuning the hand crank in one direction to heat the contents of the thermos bottle, and turning the hand crank in an opposite direction to cool the contents of the thermos bottle.

11. The method of claim 10, further comprising the step of providing a battery for increasing the electrical energy provided by the generator assembly to the Peltier.

12. The method of claim 11, further comprising the step of configuring the generator assembly to charge the battery.

13. The method of claim 12, further comprising the step of configuring the generator assembly to charge an external electrical device.

14. The method of claim 13, further comprising the step of configuring the generator assembly to heat the contents of the thermos bottle when the hand crank is turned in one direction or in an opposite direction.

15. The method of claim 14, further comprising the step of configuring the generator assembly to cool the contents of the thermos bottle when the hand crank is turned in one direction or in an opposite direction.

16. The method of claim 15, further comprising the step of providing a light on the thermos bottle.

17. The method of claim 16, further comprising the step of providing a carrying handle on the thermos bottle.

18. The method of claim 17, further comprising the step of configuring the generator assembly to be spaced apart from the thermos bottle.

19. The method of claim 18, further comprising the step of adapting the battery to be charged by using conventional alternating current.

20. The method of claim 19, further comprising the step of providing a folding hand crank, the hand crank folding between a first extended position for turning the generator assembly and a second retracted position for storage.

* * * * *